United States Patent Office.

JOHN JEANNING, OF PLAINVILLE, CONNECTICUT, ASSIGNOR TO HIMSELF AND R. B. PRINDLE, OF WASHINGTON, DISTRICT OF COLUMBIA.

Letters Patent No. 98,387, dated December 28, 1869.

IMPROVEMENT IN BLEACHING COTTON AND WOOLLEN FABRICS

The Schedule referred to in these Letters Patent and making part of the same.

*To all whom it may concern:*

Be it known that I, JOHN JEANNING, of Plainville, in the county of Hartford, and in the State of Connecticut, have invented certain new and useful Improvements in Compositions and Process for Bleaching Cotton and Woollen Fabrics; and do hereby declare that the following is a full, clear, and exact description thereof.

My invention has for its object the bleaching of woollen or cotton fabrics; and to this end, It consists, principally, in the employment of the hereinafter-described process, substantially as and for the purpose specified.

It further consists in the composition of the soap employed in the first stages of the process, as is hereinafter set forth.

It further consists in the bleaching-fluid compounded of the ingredients and in the manner hereinafter specified.

In order to better illustrate my process, I will first describe the compounds employed therein, commencing with the soap used during the first portion of the same.

To twenty-five pounds of caustic soda, having a specific gravity of 12° Baumé, is added fifty pounds of sediment of cotton-seed oil, and twenty-five pounds of rosin, and the whole boiled until changed into soap.

To twenty-five pounds of the above soap is added twelve and one-half pounds of sal-soda, twelve and one-half pounds of soda-ash, six pounds of hard tallow soap, and twenty-five gallons of water, and the mixture boiled, during which process it should be gently but thoroughly stirred.

The product of the above is a soft soap, which is employed in the manner hereinafter described.

For the bleaching-fluid, fifty pounds of hydrochlorite of lime and twenty-five pounds of sal-soda are placed in a suitable receptacle, fifteen gallons of boiling water added, and the mixture thoroughly stirred every thirty minutes during three hours, after which it is allowed to stand over night.

In the morning, after breaking any pieces of lime that may be undissolved, fifteen gallons of cool water are added, the ingredients not held in solution allowed to settle to the bottom, and the liquid is ready for use.

The fabrics to be bleached are first placed in a washing-machine, and for every one hundred pounds of said fabrics is added sixteen gallons of suds, (composed of sixteen pounds of the hereinbefore-described soft soap dissolved in twenty gallons of water, having a temperature of 160°,) and the machine caused to operate until its contents are thoroughly saturated.

A sufficient quantity of boiling water is then introduced, and the machine caused to operate from ten to twenty minutes, when the suds are permitted to escape, after which cold water is poured over the clothes, and also allowed to escape.

By the above operation, the cotton-seed oil, sediment, and rosin, are caused to combine with and saponify the resinous and gummy matters contained in the fibres, while the excess of alkali is neutralized by combining with and saponifying a large proportion of the fatty and coloring-matters contained in the fabrics, which, being rinsed out, leave the cloth in the proper condition for the final process, described below.

A suitable vat being provided, the goods are placed therein, and covered with the bleaching-fluid, having a specific gravity of $1\frac{1}{2}°$ Baumé, in which they are allowed to remain from twenty minutes to two hours, (in accordance with the weight of the fabrics,) during which time they are frequently stirred.

After remaining in the bleaching-fluid for the necessary length of time, the goods are removed, thoroughly rinsed in cool water, and then immersed in a bath composed of cool water and hydrochloric acid, (having a specific gravity of 2° Baumé,) where they are allowed to remain for the same length of time as in the preceding bath, after which they are removed, thoroughly rinsed out, and dried.

In case that the fabric is a mixture of cotton and wool, it may be found advantageous to omit the last bath, and, instead, submit the goods to the action of sulphur-vapor in a close room, by which means the desired result is produced in each of the materials in the same length of time.

The bleaching-fluid hereinbefore described does not lose its value by age or use, but, on the contrary, may remain in the vat, nothing being necessary but to replace the waste or loss of fluid, and, occasionally, to increase its strength to the required standard.

By this process, cotton or woollen goods can be thoroughly bleached, without injury, in one twenty-fourth part of the time that is required by any other means in common use.

Having thus fully set forth the nature and merits of my invention,

What I claim as new, and desire to secure by Letters Patent, is—

1. The hereinbefore-described process for bleaching woollen or cotton fabrics, substantially as set forth.

2. Also, the hereinbefore-described soap, compounded of the ingredients and in the manner substantially as and for the purpose specified.

3. Also, the hereinbefore-described bleaching-fluid, composed of the ingredients, and compounded in the manner substantially as and for the purpose shown.

In testimony that I claim the foregoing, I have hereunto set my hand, this 2d day of December, 1869.

JOHN JEANNING.

Witnesses:
BENJAMIN POLLARD,
HENRY D. STANLEY.